United States Patent
Khan et al.

(10) Patent No.: US 12,050,017 B2
(45) Date of Patent: Jul. 30, 2024

(54) BUILDING AUTOMATION SYSTEM WITH EDGE DEVICE LOCAL CONFIGURATION

(71) Applicant: Johnson Controls Tyco IP Holdings LLP, Milwaukee, WI (US)

(72) Inventors: Abu Bakr Khan, Franklin, WI (US); Trent M. Swanson, Wellington, FL (US); Sastry Malladi, Fremont, CA (US); Vineet Binodshanker Sinha, Brookfield, WI (US); Tazmin Pirani, Toronto (CA); Rajesh Venkat, Indianapolis, IN (US); Miguel Galvez, Boca Raton, FL (US); Eric G. Lang, Cedarburg, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/115,675

(22) Filed: Feb. 28, 2023

(65) Prior Publication Data
US 2023/0280059 A1 Sep. 7, 2023

Related U.S. Application Data

(60) Provisional application No. 63/315,454, filed on Mar. 1, 2022.

(51) Int. Cl.
| | | |
|---|---|---|
| *F24F 11/48* | (2018.01) | |
| *F24F 11/58* | (2018.01) | |
| *F24F 11/64* | (2018.01) | |
| *G05B 13/02* | (2006.01) | |

(52) U.S. Cl.
CPC .............. *F24F 11/48* (2018.01); *F24F 11/58* (2018.01); *F24F 11/64* (2018.01); *G05B 13/0265* (2013.01)

(58) Field of Classification Search
CPC . F24F 11/48; F24F 11/58; F24F 11/64; G05B 13/0265
USPC ..................................................... 700/29, 276
See application file for complete search history.

(56) References Cited

U.S. PATENT DOCUMENTS

| | | |
|---|---|---|
| 9,696,056 B1 | 7/2017 | Rosenberg |
| 10,007,513 B2 | 6/2018 | Malladi et al. |
| 10,127,022 B2 | 11/2018 | Sharma et al. |
| 10,379,842 B2 | 8/2019 | Malladi et al. |
| 10,564,941 B2 | 2/2020 | Lucas et al. |
| 10,572,230 B2 | 2/2020 | Lucas et al. |

(Continued)

FOREIGN PATENT DOCUMENTS

DE 10126475 A1 * 3/2003 ............ F24F 3/0442

OTHER PUBLICATIONS

International Search Report and Written Opinion on PCT Appl. Ser. No. PCT/US2023/014127 dated Jul. 4, 2023 (19 pages).

*Primary Examiner* — Thomas C Lee
*Assistant Examiner* — Michael Tang
(74) *Attorney, Agent, or Firm* — Foley & Lardner LLP

(57) ABSTRACT

A system includes a unit of building equipment serving a building and including a heating, ventilation, or cooling component and onboard circuitry configured to execute a configuration routine stored on the circuitry which automatically configures parameters of the rooftop unit based on the signals received from sensors and devices at the building. The system also includes a cloud system communicably connectable to the onboard circuitry and configured to influence the configuration routine.

23 Claims, 7 Drawing Sheets

(56) References Cited

U.S. PATENT DOCUMENTS

| | | | |
|---|---|---|---|
| 10,628,135 B2 | 4/2020 | Sharma et al. | |
| 10,778,460 B1* | 9/2020 | Khan | H04L 67/34 |
| 10,977,010 B2 | 4/2021 | Sharma et al. | |
| 11,048,498 B2 | 6/2021 | Malladi et al. | |
| 11,226,795 B2 | 1/2022 | Lucas et al. | |
| 11,422,778 B2 | 8/2022 | Sharma et al. | |
| 11,561,774 B2 | 1/2023 | Lucas et al. | |
| 11,616,839 B2 | 3/2023 | Sharma | |
| 2006/0090483 A1 | 5/2006 | Kim et al. | |
| 2014/0058567 A1 | 2/2014 | Matsuoka et al. | |
| 2015/0221207 A1* | 8/2015 | Hagan | G08B 21/22 |
| | | | 340/541 |
| 2016/0246269 A1 | 8/2016 | Ahmed et al. | |
| 2017/0060574 A1* | 3/2017 | Malladi | H04W 4/38 |
| 2017/0277800 A1* | 9/2017 | Lucas | G06F 11/3668 |
| 2017/0284691 A1 | 10/2017 | Sinha et al. | |
| 2018/0314277 A1* | 11/2018 | Moore | G05B 15/02 |
| 2019/0327861 A1* | 10/2019 | Duncan | H05K 7/20836 |
| 2019/0369984 A1 | 12/2019 | Malladi et al. | |
| 2020/0209820 A1 | 7/2020 | Kochar et al. | |
| 2020/0300495 A1* | 9/2020 | Kingetsu | F24F 11/64 |
| 2020/0334574 A1* | 10/2020 | Ishida | G06F 11/3058 |
| 2020/0355392 A1 | 11/2020 | So et al. | |
| 2020/0409883 A1 | 12/2020 | Dixit et al. | |
| 2021/0200170 A1 | 7/2021 | Ploegert et al. | |
| 2021/0326128 A1 | 10/2021 | Malladi et al. | |
| 2022/0003447 A1* | 1/2022 | Williams | F24F 11/46 |
| 2022/0004445 A1 | 1/2022 | George et al. | |
| 2022/0406195 A1* | 12/2022 | Janakiraman | G08G 5/0052 |
| 2023/0196135 A1 | 6/2023 | Kumar et al. | |

* cited by examiner

BUILDING AUTOMATION SYSTEM WITH EDGE DEVICE LOCAL CONFIGURATION

CROSS-REFERENCE TO RELATED APPLICATIONS

This application claims the benefit of and priority to U.S. Provisional Patent Application No. 63/315,454, filed Mar. 1, 2022, the entire disclosure of which is incorporated by reference herein in its entirety.

BACKGROUND

The present disclosure relates generally to building equipment and building automation systems. Conventional building automation systems include complex architectures that can require a wide number of devices, supervisory and field controllers, on-premises servers, off-premises servers, and other infrastructure to be manually configured by field technicians in order to establish and maintain a building automation system. Such architectures may be suitable for large scale facilities but substantially different in structure than building automation systems for smaller scale entities, leading to extra complexity (e.g., driven by higher numbers of different tools and platforms) and preventing or complicating comparisons across facilities of different type and size. Additionally, each of such building devices may have limited functionality or execute limited types of logic and diverse devices, including different equipment, sensors, data sources, etc. (including within a given building), often use different protocols and data formats which create barriers to integrations and reduce interoperability between building devices. The present disclosure addresses these and other challenges.

SUMMARY

One implementation of the present disclosures is a rooftop unit including a housing, air conditioning components coupled to the housing, and circuitry enclosed within and/or coupled to the housing and programmed to execute a control logic for the air conditioning components, an expression-based event processing logic, and a machine learning algorithm.

In some embodiments, the expression-based event processing logic performs pattern recognition for data received by the circuitry from the air conditioning components or one or more external data sources. In some embodiments, the machine learning algorithm is based on a machine learning model trained at a cloud system remote from the rooftop unit. In some embodiments, the machine learning algorithm includes a modified version of the machine learning model trained at the cloud system that is configured to execute on more limited processing resources of the circuitry relative to the cloud system.

In some embodiments, the expression-based event processing logic diagnoses occurring fault conditions and the machine learning algorithm predicts future fault conditions. In some embodiments, the circuitry is programmed to modify the expression-based event processing logic in response to remote updates received at the circuitry. The expression-based event processing logic and the machine learning algorithm may have a combined memory footprint of less than 256 MB.

In some embodiments, the rooftop unit of claim 1, wherein the circuitry receives a first data set from the air condition components and a second data set from an external sensor, wherein the machine learning algorithm uses the first data set and the second data set as inputs. The external sensor may be an indoor air quality sensor.

In some embodiments, the circuitry is configured to established communications with a cloud system and the control logic for the air conditioning components, the expression-based event processing logic, and the machine learning algorithm are functional during interruptions of the communications with the cloud system.

In some embodiments, the control logic for the air conditioning components is a native control logic and the expression-based event processing logic includes a supplement or modification of the native control logic. The supplement or modification of the native control logic may be received from the cloud system or another computing system external from the rooftop unit via a network connection. The supplement or modification of the native control logic may be received after installation of the rooftop unit while the rooftop unit is connected to the network connection and operational.

In some embodiments, the control logic includes a first set of one or more fault detection and/or diagnostics rules, and the expression-based event processing logic includes a second set of one or more fault detection and/or diagnostics rules that supplement or modify the first set of one or more fault detection and/or diagnostics rules. The second set of one or more fault detection and/or diagnostics rules is received from the cloud system or another source remote from the rooftop unit and defined according to an expression-based language.

Another implementation of the present disclosure is a unit of building equipment including a mechanical component controllable to affect a condition of a building and circuitry packaged with the mechanical component and programmed to execute a control logic for the heating, ventilation, or cooling component, an expression-based event processing logic, and a machine learning algorithm.

In some embodiments. the expression-based event processing logic performs pattern recognition for data received by the circuitry from the mechanical component or one or more external data sources. The machine learning algorithm may be based on a machine learning model trained at a cloud system remote from the rooftop unit. The machine learning algorithm may include a modified version of the machine learning model trained at the cloud system that is configured to execute on more limited processing resources of the circuitry relative to the cloud system.

In some embodiments, the expression-based event processing logic diagnoses occurring fault conditions and the machine learning algorithm predicts future fault conditions. In some embodiments, the circuitry is programmed to modify the expression-based event processing logic in response to remote updates received at the circuitry. The expression-based event processing logic and the machine learning algorithm may have a combined memory footprint of less than 256 MB.

In some embodiments, the circuitry receives a first data set from the mechanical component and a second data set from an external sensor, wherein the machine learning algorithm uses the first data set and the second data set as inputs. The external sensor may be an indoor air quality sensor.

In some embodiments, the circuitry is configured to established communications with a cloud system and the control logic for the mechanical component, the expression-based event processing logic, and the machine learning algorithm are functional during interruptions of the communications with the cloud system.

In some embodiments, the control logic for the air conditioning components is a native control logic. The expression-based event processing logic may include a supplement or modification of the native control logic. The supplement or modification of the native control logic may be received from the cloud system or another computing system external from the unit via a network connection. The supplement or modification of the native control logic can be received after installation of the unit while the unit is connected to the network connection and operational.

In some embodiments, the control logic includes a first set of one or more fault detection and/or diagnostics rules, where the expression-based event processing logic includes a second set of one or more fault detection and/or diagnostics rules that supplement or modify the first set of one or more fault detection and/or diagnostics rules. The second set of one or more fault detection and/or diagnostics rules may be received from the cloud system or another source remote from the unit and defined according to an expression-based language.

Another implementation of the present disclosure is a system. The system includes, a unit of building equipment including a heating, ventilation, or cooling component, onboard circuitry configured to execute a control logic for the heating, ventilation, or cooling component, an expression-based event processing logic, and a machine learning algorithm, and a cloud system communicably connectable to the onboard circuitry and including circuitry. The circuitry of the cloud system is configured to transmit an expression to the onboard circuitry for use by the expression-based event processing logic and transmit a machine learning model to the onboard circuitry for use by the machine learning algorithm.

In some embodiments, the expression-based event processing logic performs pattern recognition for data received at the onboard circuitry from the heating, ventilation, or cooling component or an external data source. In some embodiments, the cloud system is configured to generate the machine learning model by training a neural network on a training data set including historical data from at least one of the building equipment or other building equipment and generating the machine learning model to transmit to the onboard circuitry using the trained neural network. In some embodiments, the expression-based event processing logic diagnoses occurring fault conditions and the machine learning algorithm predicts future fault conditions. The expression-based event processing logic and the machine learning algorithm may have a combined memory footprint of less than 256 MB.

In some embodiments, the system also includes a plurality of external data sources providing a plurality of data streams to the onboard circuitry, where the expression-based even processing logic and the machine learning algorithm are adapted to use the plurality of data streams as inputs. The control logic, the expression-based event processing logic, and the machine learning algorithm may be fully functional during interruptions of a connection between the onboard circuitry and the cloud system.

Another implementation of the present disclosure is a method. The method includes providing a package including a heating, ventilation, or cooling component and onboard circuitry. The method also includes executing, by the onboard circuitry, control logic to control the heating, ventilation, or cooling component, executing, by the onboard circuitry, an expression-based event processing logic, and executing, by the onboard circuitry, a machine learning algorithm.

In some embodiments, the method further includes training, by a computing system remote from the onboard circuitry, a neural network on a training data set includes historical data from at least one of the heating, ventilation, or cooling component or other heating, ventilation, or cooling components. The method may also including generating the machine learning model to transmit to the onboard circuitry using the trained neural network.

In some embodiments, executing the expression-based event processing logic provides recognition of patterns in data received at the onboard circuitry from the heating, ventilation, or cooling component or another data source. Executing the expression-based event processing logic may diagnose an occurring fault condition. Executing the machine learning algorithm may predict a future fault condition.

In some embodiments, the method also includes receiving, at the onboard circuitry and from a cloud system, a set of expressions and a machine learning model. Executing the expression-based event processing logic includes using the set of expressions and executing the machine learning model includes using the machine learning model.

Another implementation of the present disclosure is a rooftop unit including a housing, air conditioning components coupled to the housing, and onboard circuitry enclosed within and/or coupled to the housing and programmed to receive data from a plurality of data sources communicably coupled to the onboard circuitry. The data is received in a plurality of different formats according to a plurality of different protocols. The circuitry is also programmed to translate the data from the plurality of formats into a common data format and perform operations onboard the rooftop unit using the data in the common data format.

In some embodiments, the plurality of protocols include two or more of MQTT, BACnet, Modbus, data distribution service (DDS), or OPC Unified Architecture (OPCUA). In some embodiments, the plurality of data sources include two or more of a temperature sensor, and indoor air quality sensor, an airflow sensor, a pressure sensor, an occupancy sensor, the air conditioning components, an additional rooftop unit, or a different type of building equipment. In some embodiments, the circuitry uses an analytic expression language to translate the data from the plurality of data sources into the common data format. In some embodiments, the circuitry translates the data in real time as the data streams to the circuitry from the plurality of data sources.

In some embodiments, the common data format is a Brick format. The onboard circuitry is configured to translate the data into the common data format by applying tags to the data. The tags may correspond to types of entities and types of relationships between the entities. The tags may include location, event, asset, and place tags.

In some embodiments, the rooftop unit may include an onboard computer-readable storage medium. The circuitry may be configured to ingest the data in the common data format into a locally-stored digital twin stored within the onboard computer-readable storage medium. In some embodiments, the circuitry is further configured to transmit the data in the common data format to an off-premises computing system and cause the data in the common data format to be stored in a digital twin at the off-premises computing system.

In some embodiments, the circuitry is further configured to execute a machine learning model stored onboard the rooftop unit that uses the data in the common data format as an input. In some embodiments, the circuitry is further configured to filter, normalize, and align the data to facilitate use of the data as the input to the machine learning model. The circuitry may include a common data bus such that the circuitry is configured to provide the data in the common data format on the common data bus.

Another implementation of the present disclosure is a method. The method includes delivering and installing a package including a heating, ventilation, or cooling component and onboard circuitry, connecting the onboard circuitry to a plurality of data sources that use a plurality of data protocols, receiving, by the onboard circuitry, data from the plurality of data sources and translating by the onboard circuitry, the data from the plurality of data protocols to a common data format in real time. The method may also including affecting, by the onboard circuitry, operation of the heating, ventilation, or cooling component by executing an operation using the data in the common data format.

In some embodiments, the plurality of data protocols include two or more of MQTT, BACnet, Modbus, data distribution service (DDS), or OPC Unified Architecture (OPCUA). In some embodiments, the plurality of data sources include two or more of a temperature sensor, and indoor air quality sensor, an airflow sensor, a pressure sensor, an occupancy sensor, the heating, cooling, or ventilation component, or a different type of building equipment.

In some embodiments, translating the data from the plurality of data protocols to a common data format in real time is performed using an analytic expression language. In some embodiments, the common data format is a Brick format with location, event, asset, and place (LEAP) tags, and translating the data into the common data format includes applying tags to the data. The tags may correspond to types of entities and types of relationships between the entities. The tags may include location, event, asset, and place tags.

In some embodiments, the method includes ingesting the data into a digital twin stored within an onboard computer-readable storage medium coupled to the heating, ventilation, or cooling component. The method may further include causing the data to be stored in a digital twin stored at an off-premises computing system communicable with the onboard circuitry.

In some embodiments, the method also includes executing, by the onboard circuitry, a machine learning model stored at the onboard circuitry using the data in the common data format as an input. The method can also include further including filtering, normalizing, and aligning, by the onboard circuitry, the data to facilitate use of the data as the input to the machine learning model.

Another implementation of the present disclosure is a system. The system includes a unit of building equipment including onboard circuitry, a plurality of data sources communicably coupled to the onboard circuitry such that data is received at the onboard circuitry from the plurality of data sources in a plurality of different formats according to a plurality of different protocols. The onboard circuitry is configured to translate the data from the plurality of data sources and associated with the plurality of data protocols into a common data set having a common data format and locally execute logic relating to operation of the unit of building equipment using the common data set having the common data format.

In some embodiments, the logic includes one or more of feedback control logic, expression-based pattern recognition logic, or a machine learning algorithm.

Another implementation of the present disclosure is a unit of building equipment. The unit of building equipment includes onboard circuitry programmed to receive data from a plurality of data sources communicably coupled to the onboard circuitry, the data received in a plurality of different formats according to a plurality of different protocols, translate the data from the plurality of formats into a common data format, and perform operations onboard the unit of building equipment using the data in the common data format.

Another implementation of the present disclosure is a rooftop unit. The rooftop unit includes a housing, air conditioning components coupled to the housing, and onboard circuitry enclosed within and/or coupled to the housing and including inputs configured to receive signals from a plurality of sources communicably coupled to the onboard circuitry. The onboard circuitry is programmed to execute a configuration routine stored on the circuitry configured to automatically configure operating parameters of the rooftop unit based on the signals received via the inputs.

In some embodiments, the configuration routine includes pattern recognition performed using an expression-based processing language. In some embodiments, the configuration routine uses a machine learning model stored and executed on the rooftop unit. The configuration routine may configured to identify devices associated with the signals. Automatically configuring the parameters may be based on identities of the devices. Automatically configuring the parameters may be based on point values represented by the signals. Automatically configuring the parameters may be based on a plurality of data protocols used by the plurality of sources.

In some embodiments, executing the configuration routine includes executing a first routine on the circuitry of the rooftop unit, and responsive to triggering of a condition of the first routine, causing execution of a second routine by a cloud system communicable with the circuitry and receiving at least a portion of a configuration of the operating parameters from the cloud system in response.

In some embodiments, the onboard circuitry is communicable with a cloud system and receives an additional parameter for the rooftop unit from the cloud system. The configuration routine may be trained based on a history of configurations of other rooftop units. The configuration routine may be trained based on a history of configurations of other rooftop units and data relating to other devices in or on a same building or space as the other rooftop units.

In some embodiments, the onboard circuitry is configured to detect an addition or removal of a source of the plurality of sources and the configuration routine is configured to update the parameters in response to the addition or removal. In some embodiments, the onboard circuitry is configured to detect a trend in a value of a point provided by a first source of the plurality of sources, and the configuration routine is configured to adjust a first parameter of the parameters based on the trend.

In some embodiments, the circuitry is configured to execute the configuration routine to adjust a first parameter of the parameters based on comparison of or a trend in values of a plurality of points received from two or more different sources of the plurality of sources. In some embodiments, the plurality of sources include local sources located at a same facility as the rooftop unit, internal sources at or proximate the rooftop unit, peer sources communicating in a peer-to-peer fashion with the onboard circuitry, or external sources communicating directly with the onboard circuitry or only via devices located at the same facility.

Another implementation of the present disclosure is a system. The system includes a unit of building equipment serving a building and including a heating, ventilation, or cooling component and onboard circuitry configured to execute a configuration routine stored on the circuitry which automatically configures parameters of the rooftop unit based on the signals received from sensors and devices at the building. The system also includes a cloud system communicably connectable to the onboard circuitry and configured to influence the configuration routine.

In some embodiments, the cloud system is configured to influence the configuration routine by training a machine learning model based on historical configurations and providing a result of the training to the onboard circuitry for use in the configuration routine. In some embodiments, the cloud system is configured to create a modified version of the machine learning model trained at the cloud system that is configured to execute on more limited processing resources of the circuitry relative to the cloud system and provide the modified version to the onboard circuitry.

In some embodiments, the cloud system is configured to influence the configuration routine by training a machine learning algorithm on historical configurations, using the machine learning algorithm to determine a set of rule-based or expression-based logic, and pushing the set of rule-based or expression-based logic to the onboard circuitry for execution by the onboard circuitry as a part of the configuration routine. In some embodiments, the cloud system is configured to influence the configuration routine by configuring additional parameters of rooftop unit.

In some embodiments, the onboard circuitry is further configured to provide the parameters to the cloud system, and wherein the cloud system stores the parameters in a digital twin. In some embodiments, the onboard circuitry is further configured to store a digital twin and integrate the parameters into the digital twin.

Another implementation of the present disclosure is a method. The method includes providing a package including a heating, ventilation, or cooling component and onboard circuitry, connecting the onboard circuitry to a plurality of data sources and to a cloud system, detecting, by the onboard circuitry, characteristics of data received from the plurality of data sources and forwarding the characteristics to the cloud system, generating, by the cloud system, a configuration for use by the onboard circuitry in managing operations of the heating, ventilation, or cooling component, and automatically configuring the onboard circuitry in accordance with the configuration from the cloud system.

In some embodiments, generating the configuration includes using the characteristics as inputs to a machine learning model trained on historical configurations for other building equipment communicable with the cloud system. In some embodiments, the plurality of sources include local sources located at a same facility as the rooftop unit, internal sources at or proximate the rooftop unit, peer sources communicating in a peer-to-peer fashion with the onboard circuitry, or external sources communicating directly with the onboard circuitry or only via devices located at the same facility.

Another implementation of the present disclosure is a unit of building equipment. The unit of building equipment includes onboard circuitry including inputs configured to receive signals from a plurality of sources communicably coupled to the onboard circuitry. The onboard circuitry is programmed to execute a configuration routine stored on the onboard circuitry configured to automatically configure operating parameters of the unit of building equipment based on the signals received via the inputs.

Another implementation of the present disclosure is a system. The system includes a cloud system in communication with a first unit of building equipment and a second unit of building equipment. The cloud system is configured to aggregate event data from a first unit of building equipment at a first building including first onboard circuitry configured to perform first onboard event processing to generate the event data for the first unit building equipment and a second unit of building equipment at a second building including second onboard circuitry configured to configured to perform the second onboard event processing to generate event data for the second unit building equipment. The cloud system is also configured to provide a user interface including a view of the aggregated event data for the first unit of building equipment and the second unit of building equipment.

In some embodiments, the first unit of building equipment is owned by a first customer, the second unit of building equipment is owned by a second customer, and the cloud system is configured to provide the user interface to a distributor via a distributor portal. In some embodiments, the first building is a branch location and the second building is a headquarters location. In some embodiments, the first building is a retail location and the second building is a warehouse.

In some embodiments, the first onboard event processing includes calculating a first performance index value for the first unit and the second onboard event processing includes calculating a second performance index value for the second unit. The user interface can display the first performance index value and the second performance index value. In some embodiments, the first unit of building equipment and the second unit of building equipment provides the event data to the cloud system in a common data format. The common data format may identify a location and an owner associated with a set of data.

In some embodiments, the first unit of building equipment is a rooftop unit and the second unit of building equipment is a chiller. In some embodiments, the event data includes a fault diagnosis.

In some embodiments, the cloud system is configured to receive event data generated by a third unit of building equipment at a third building, aggregate the event data from the third unit with the event data from the first unit and the second unit, and apply a filtering rule to omit the third data from the user interface including the aggregated event data for the first unit and the second unit. In some embodiments, the cloud system is configured to receive event data generated by a third unit of building equipment at a third building, aggregate the event data from the third unit with the event data from the first unit and the second unit, and determine at least one of an order or a visual effect for the presentation of the respective event data from the first unit, the second unit, and the third unit based on characteristics of the event data.

Another implementation of the present disclosure is a method. The method includes aggregating event and performance data from a fleet of building equipment and displaying a visualization of the event and performance data for the fleet of building equipment. The visualization includes options to filter the event and performance data based on characteristics of units in the fleet of building equipment, the characteristics including location, owner, lead technician, sales representative, equipment type, equipment model, and/ or ongoing or recent events. The event and performance data is automatically associated with the characteristics by the fleet of building equipment.

In some embodiments, the fleet of building equipment includes a plurality of types of equipment serving a plurality of types of facilities. The plurality of types of facilities may include branch locations and a headquarters campus. The plurality of types of facilities may include storefronts and warehouses.

In some embodiments, the visualization further includes options to rank the units in the fleet of building equipment based on values of a performance metric calculated locally on the units of the fleet of building equipment. In some embodiments, the fleet of building equipment serves customers of a distributor and wherein the method includes displaying the visualization to the distributor.

In some embodiments, the method also includes generating, locally on circuitry of a unit of building equipment, a recommended intervention and displaying the recommended intervention with the visualization. Generating the recommended intervention may include predicting a fault for the unit of building equipment.

Another implementation of the present disclosures is a rooftop unit. The rooftop unit includes a housing, air conditioning components coupled to the housing, and circuitry enclosed within and/or coupled to the housing. The circuitry is configured to generate event and performance data for the rooftop unit based on data relating to operation of the air conditioning components and using one or both of expression-based pattern event processing and a machine learning algorithm. The circuitry is also configured to transmit the event and performance data to a distributor portal for display alongside event and performance data for additional rooftop units, wherein the circuitry is configured to provide the event and performance data in a standard format that identifies a location and identity of the rooftop unit.

In some embodiments, the event and performance data includes a fault diagnosis. In some embodiments, the event and performance data includes a performance index score calculated based on a number of faults identified in the event and performance data.

Another implementation of the present disclosure is unit of building equipment including onboard circuitry programmed to generate event and performance data for the unit of building equipment based on data relating to operation of the unit of building equipment and using one or both of expression-based pattern event processing and a machine learning algorithm. The onboard circuitry is also configured to transmit the event and performance data to a distributor portal for display alongside event and performance data for other building equipment, wherein the circuitry is configured to provide the event and performance data in a standard format that identifies a location and identity of the unit of building equipment.

Another implementation of the present disclosure is a system. The system includes a first unit of building equipment operable to provide heating, ventilation, or cooling to a building. The first unit of building equipment includes local processing circuitry integrated with the first unit of building equipment. The system also includes a plurality of additional units of building equipment serving the building, where the plurality of additional units of building equipment are directly communicable with the local processing circuitry of the first unit of building equipment, and where the local processing circuitry is configured to perform a first set of analytics using data for the first unit of building equipment and data from the plurality of additional units of building equipment. The system also includes an off-premises computing system located remotely from the building and communicable directly with the local processing circuitry. The off-premises server configured to perform a second set of analytics using the data for the first unit of building equipment and the data from the plurality of additional units of building equipment.

In some embodiments, the first unit of building equipment and the plurality of additional units of building equipment communicate directly via peer-to-peer communication. In some embodiments, the off-premises server is directly communicable with the first unit of building equipment via networking infrastructure without any intervening field or supervisory controllers.

In some embodiments, the local processing circuitry includes a data bridge component configured to facilitate communication of the data for the first unit of building equipment and the data from the plurality of additional units of building equipment to the off-premise server. In some embodiments, the first unit of building equipment, the plurality of additional units of building equipment, and the off-premises server are arranged in an architecture which is agnostic of a count of a type or size of the building. The architecture may be further agnostic of a count of the plurality of additional units of building equipment and equipment types of the first unit of building equipment and the plurality of additional units of building equipment.

In some embodiments, the first set of analytics includes expression-based event processing. In some embodiments, the first set of analytics includes using a machine learning algorithm.

In some embodiments, the system further includes a plurality of sensors providing sensor data to the local processing circuitry. The local processing circuitry may be further configured to standardize a data format of the sensor data, the data for the first unit of building equipment, and the data from the plurality of additional units of building equipment.

In some embodiments, the first unit of building equipment is a rooftop unit. The first unit of building equipment and the plurality of additional units of building equipment may be rooftop units. In some embodiments, the first unit of building equipment and the plurality of additional units are one or more types of building equipment selected from a set including rooftop units, chillers, boilers, cooling towers, air handling units, variable air volume boxes, variable refrigerant flow outdoor units, and variable refrigerant flow indoor units. In some embodiments, the plurality of additional units of building equipment include central plant equipment.

Another implementation of the present disclosures is a system. The system consists of a plurality of units building equipment operable to directly affect one or more physical conditions of a building, communications network infrastructure, and an off-premise computer communicable with the plurality of units of building equipment via the networking infrastructure. The plurality units of building equipment include a plurality of processing units programmed to enable data pipelines between the plurality of units of building equipment and the off-premise computer.

In some embodiments, the plurality of processing units are further programmed to locally executing expression-based event processing logic. The plurality of processing units may be further programmed to store and use the machine learning models. In some embodiments, the plurality of units building equipment include lighting equipment and heating, ventilation, or cooling equipment.

Another implementation of the present disclosure is a unit of building equipment. The unit of building equipment includes a housing, heating, cooling, or ventilation components coupled to the housing, and onboard circuitry enclosed within and/or coupled to the housing and programmed to communicate directly with both a plurality of additional units of building equipment and an off-premise computing system.

In some embodiments, the onboard circuitry is directly communicable with the off-premise computing system via networking infrastructure without any intervening field or supervisory controllers. In some embodiments, the onboard circuitry includes a data bridge component configured to facilitate communication of the data for the first unit of building equipment to the off-premise server.

Another implementation of the present disclosures is a method. The method includes providing a plurality of units building equipment operable to directly affect one or more physical conditions of a building, connecting the plurality of units of building equipment to a communication network, and automatically establishing, by the plurality of units of building equipment, communications between the plurality of units of building equipment and an off-premise server via the communication network. Such communications are not routed through any controllers external to the plurality of units of building equipment.

In some embodiments, the method also includes providing a hybrid building management service including first processing operations executed locally on the plurality of units of building equipment and second processing operations executed on the off-premise server. In some embodiments, the method also includes automatically populating a digital twin with an arrangement of the plurality of units of building equipment in response to establishment of the communications.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Referring generally to the figures, advances in building automation systems are shown according to various embodiments. The advances described herein, in various embodiments, leverage multi-domain expertise to embed intelligence and data at the edge, enable faster deployment of building equipment and building automation systems via a plug-and-play architecture, seamlessly share data and optimize multiple competing demands using the organized data, provide a scalable architecture enabled to work across different size buildings from large/complex (e.g., hospital, headquarters) to light commercial (e.g., retail storefront, small office), provide a hybrid architecture with on-premises capabilities and cloud readiness, are future-proofed by over-the-air update capabilities, provide high levels of cyber security, and/or provide an easy on-ramp for advanced digital features. The building automation systems herein may enable fixed function controls, configurable controls, pro-figurable functions, and/or programmable/fully-customizable functions in various embodiments and at various scales.

The present disclosure contemplates, in some embodiments, factory-shipping packaged control circuitry with a unit of building equipment (e.g., a rooftop unit, a chiller, etc.) (i.e., as an integrated package, on one pallet, positioned in shared housing, etc.), where the onboard/integrated circuitry provides various advanced data ingestion, machine learning, expression-based pattern recognition, and/or other control and analytics functions as detailed below. The present disclosure also contemplates retrofitting existing buildings or equipment by installing such circuitry with existing equipment, in some implementations. Such circuitry may further included embedded cloud bridge technology and/or building twin technology to enable hybrid digital functionalities in seamless and direct interaction with cloud services including cloud-based digital twins, edge-based digital twins, or a combination thereof. Such unification of advanced functionalities at the edge can drive local improvements for internal operation of a unit of building equipment, plug-and-play higher-order cloud analytics and control optimizations, and automatic data standardization and aggregation enabling visualizations across facilities, owners, customers, and equipment types.

These and other features and advantages are described in further detail below with reference to the drawings.

Figure 1:
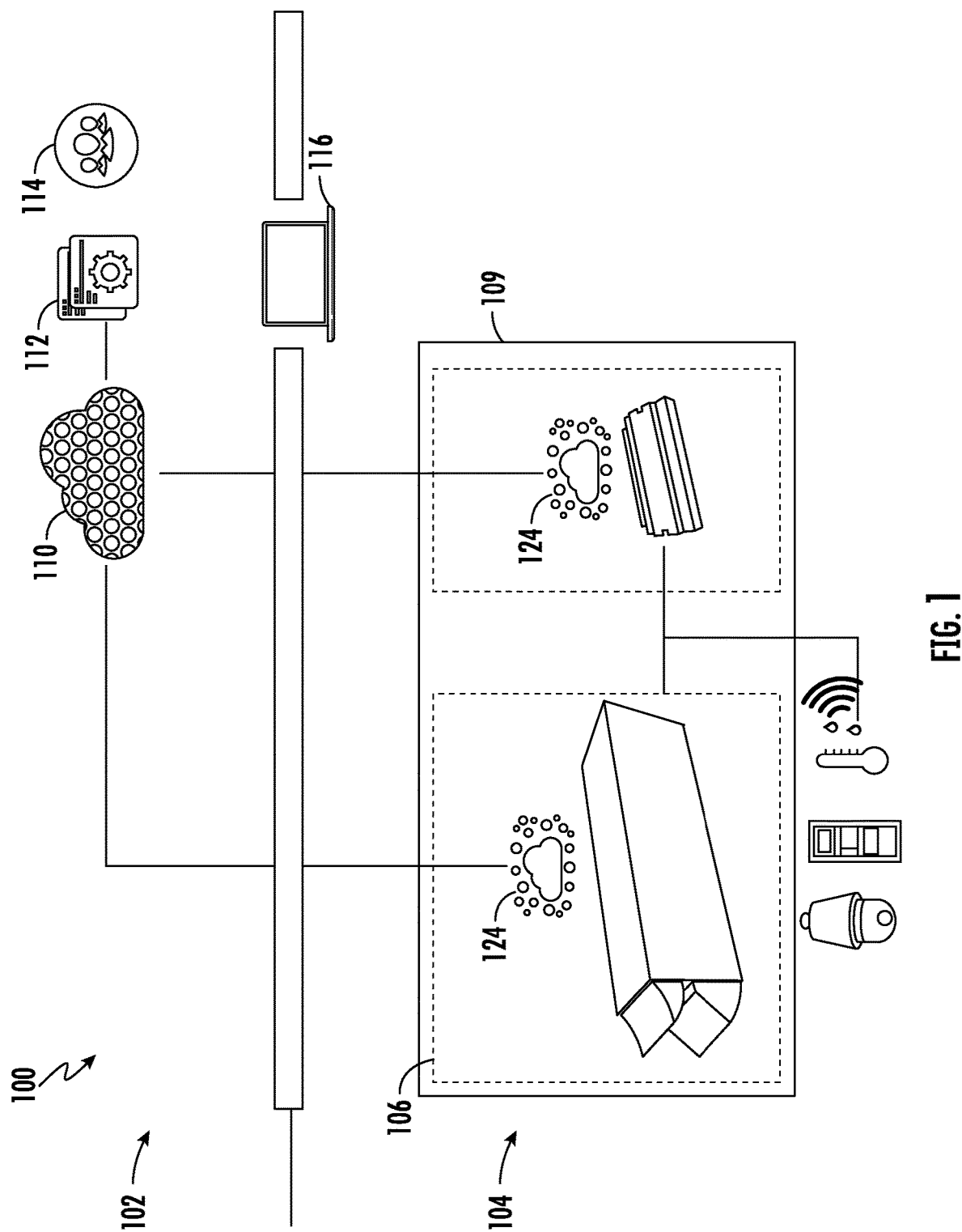
FIG. 1 is a first block diagram of a building automation system, according to some embodiments.

Referring now to FIG. 1, a building automation system 100 is shown according to some embodiments. The building automation system 100 is shown as including a cloud tier 102 and an on-premises tier 104, where the on-premises tier 104 includes an equipment unit 106 with edge circuitry 108 (e.g., onboard circuitry, local circuitry) communicable directly with the cloud tier 102 and in particular with cloud system 110 of the cloud tier 102 (e.g., via only network communications infrastructure, internet architecture, without intervening supervisory or field controllers, etc.). The cloud tier 102 is also shown as including cloud applications 112 and remote services 114, both or either which may be executed by or via cloud system 110, for example. A unified pane 116 is accessible via the cloud tier 102 and/or the on-premises tier 104 and provides visualizations of and user interactivity with the building automation system 100 and data relating thereto. The on-premises tier 104 is shown as including various data sources, shown as security sensor 118, fire alarm pull 120, and a temperature sensor 122.

While FIG. 1 shows the security sensor 118, fire alarm pull 120, and temperature sensor 122. In various embodiments, the data sources can include various sensors (security sensors, cameras, door sensors, smoke detectors, fire sensors, indoor temperatures sensors, pressure sensors, outdoor temperature sensors, humidity sensors, occupancy sensors, air quality sensors, flow meters, power meters, etc.), equipment (e.g., rooftop units, chillers, air handling units, variable air volume boxes, etc.), or other devices or systems (e.g., building scheduling system, thermostats, nurse call system, etc.). The data sources can include local sources located at a same facility as the rooftop unit, internal sources at or proximate the rooftop unit, peer sources communicating in a peer-to-peer fashion with the onboard circuitry, and/or external sources communicating directly with the onboard circuitry or only via devices located at the same facility. The data sources can provide (e.g., stream substantially continuously, periodically transmit, etc.) signals (data, information, etc.) to the edge circuitry 108.

The equipment unit 106 and the edge circuitry 108 can share a housing 109, for example with a heating, ventilation, or cooling component (e.g., compressor, evaporator, valve, actuator, fan, damper, cooling coil, heating coil, etc.) of the equipment unit 106 and the edge circuitry 108 both coupled to and/or enclosed within the housing 109. In some embodiments, the equipment unit 106 and the edge circuitry 108 are packaged together at a factory or warehouse and delivered as an integrated package (e.g., coupled to a common pallet) to a building site for installation. In the example of FIG. 1, the equipment unit 106 is a rooftop unit. The equipment unit 106 may be one or more of various other types of building equipment in other embodiments (e.g., chiller, air handling unit, variable air volume box, cooling tower, actuator, valve, air purifier, water heater, boiler, thermal energy storage, battery, variable refrigerant flow outdoor unit, variable refrigerant flow indoor unit, lighting device, controllable security device, controllable fire safety device, etc.). The equipment unit 106 is operable to affect a variable condition of a building (e.g., temperature, humidity, airflow, air quality, pressure, brightness, lighting color temperature, etc.).

As shown in FIG. 1, the equipment unit 106 and the edge circuitry 108 include a bridge communications layer 124 that enables communication between the on-premises tier 104 and the cloud tier 102. The bridge communications layer 124 is configured to provide a bridge between the edge circuitry 108 and the cloud system 110, for example as described in U.S. Provisional Patent Application No. 63/296,078, filed Jan. 3, 2022, the entire disclosure of which is incorporated by reference herein. The edge circuitry 108 can store a portion of a digital twin of a facility served by the equipment unit 106, for example a digital twin with event enrichment and contextual information as described in U.S. application Ser. No. 17/504,121 filed Oct. 18, 2021, the entire disclosure of which is incorporated by reference herein. In some implementations, the bridge communications layer 124 may additionally or alternatively perform certain processing and/or storage, such as processing of remotely programmed rules or artificial intelligence/machine learning routines and/or storage of digital twins, on-premises, such as at the equipment unit 106.

The cloud tier 102 is shown as including a cloud system 110 and associated cloud applications 112 and remote services 114. The cloud applications 112 can include fault prediction, detection, and diagnostic features that predict, detect, and/or diagnose faults of the equipment unit 106, and, in some embodiments, recommend maintenance or automatically cause a change in control of the equipment unit 106 to prevent or mitigate such faults. As another example, the cloud applications 112 can include optimization applications that perform optimizations configured to reduce utility costs, energy usage, carbon emissions, or some combination thereof, for example subject to constraints that ensure occupant comfort, and provide control settings (e.g., zone temperature setpoints) to the equipment unit 106 as the output of such applications (e.g., for example, as described in U.S. Patent Publication No. 2020/0041158, filed Oct. 10, 2019 and/or U.S. patent application Ser. No. 17/668,791, filed Feb. 10, 2022, the entire disclosures of which are incorporated by reference herein. As another example, the cloud applications 112 can include sustainability tools for managing pollution emissions (e.g., carbon emissions) and/or generating control settings for the equipment unit 106 to achieve an emissions target (e.g., net zero energy consumption), for example as described in U.S. Provisional Patent Application No. 63/301,910, filed Jan. 21, 2022, the entire disclosure of which is incorporated by reference herein. In some implementations, the cloud applications 112 may include features relating to assessing and improving occupant, space/building and/or environment health, indoor air quality, and/or infection risk, for example as described in U.S. Provisional Patent Application No. 63/230,608, filed Aug. 6, 2021, U.S. patent application Ser. No. 17/459,963, filed Aug. 27, 2021, and U.S. Provisional Patent Application No. 63/281,409, filed Nov. 19, 2021, the entire disclosures of each of which are incorporated herein by reference. While these features are described as being optional parts of the cloud applications 112, it should be understood that, in various implementations, aspects of the features may additionally or alternatively be implemented as part of the on-premises tier 104, such as within the edge circuitry 108. For example, in some implementations, one or more of these or other features may be implemented fully within the edge circuitry 108, and in some implementations, a portion of the features may be implemented within the edge circuitry 108 and a portion may be implemented within the cloud applications 112 (e.g., such that the edge circuitry 108 and the cloud applications 112 work in concert to execute the features). The remote services 114 can enable expert access to data relating to the equipment unit 106 and expert interventions relating to operation of the equipment unit 106, for example.

In some implementations, the architecture shown in FIG. 1 may have several advantages over a more conventional, multi-tiered building automation system (BAS) architecture. A multi-tiered BAS architecture may include, for example, edge devices such as rooftop units (RTUs), chillers, air handling units (AHUs), and the like, and may further include multiple layers of controllers to interface with such units. For example, in such an architecture, an edge device such as a RTU may interface with a field controller, which may be located proximate to or otherwise in direct communication with the RTU. The field controller may in turn interface with a supervisory controller, which may interact with local, on-premises controls and/or cloud or other off-premises services.

In some implementations of the present disclosure, as illustrated in FIG. 1, the edge devices, such as the RTU, may interface directly with cloud or other off-premises systems/services via the edge circuitry 108. Accordingly, some implementations of the present disclosure provide a flattened architecture relative to a multi-tiered architecture and may, for example, remove the need for one or more intervening controllers (e.g., field controllers, supervisory controllers, etc.). In some implementations, some functions of such devices may be implemented in the edge circuitry 108, the cloud applications 112, or a hybrid thereof.

Such an architecture can substantially reduce the time to install a new building management system/building automation system (e.g., reducing installation and configuration time from weeks to hours, in some instances). The architecture may support over the air updates and remote serviceability through the cloud tier 102. The architecture may support higher-order analytics that may be performed at the cloud tier 102, the on-premises tier 104 (e.g., at the edge circuitry 108), or by a hybrid combination thereof. The architecture may allow for quicker and easier configuration of such analytics as well (e.g., reducing the time to onboard/activate particular analytics services, such as from weeks to hours in some cases). The architecture may support automated configuration of some equipment and services. In some implementations, the architecture may reduce or eliminate the need for multiple, disjointed user interfaces, data models, and other tools and instead allow for a unified set of tools/models/interfaces to be applied across a variety of equipment/spaces/buildings/applications/etc.

It should be understood that edge circuitry, as utilized herein, does not require that the described components/apparatus be separate and distinct circuitry, such as separate circuitry from that of edge devices such as rooftop units or chillers. Rather, in various implementations, the edge circuitry or other circuitry described herein may be implemented as separate hardware and/or software, integrated with or be a part of existing hardware/software of existing devices, such as edge devices like rooftop units/chillers or other on-premises computing devices such as servers or controllers, or a combination thereof. In some implementations, the edge circuitry or other circuitry described herein may be implemented as instructions stored on one or more computer-readable storage media, such as storage media of an existing device or on a separate storage medium, that are executable by one or more processors (e.g., processors of existing equipment or other processors) to implement functions described herein. In some implementations, the instructions may be added to one or more on-premises devices, such as by providing some or all of the instructions to the devices during manufacturing or after installation/during operation via in-person or remote programming of the devices.

Figure 2:
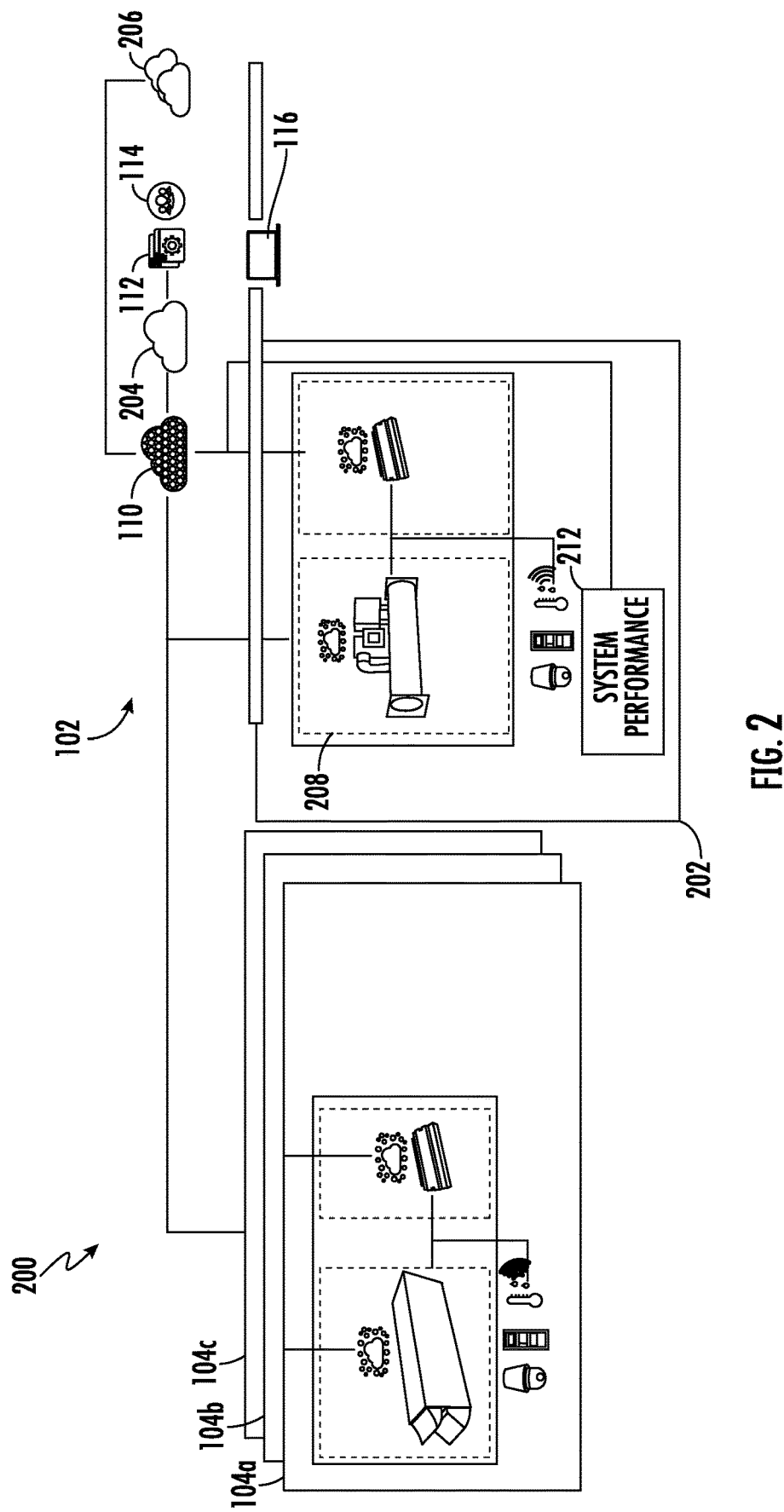
FIG. 2 is a second block diagram of a building automation system, according to some embodiments.

Referring now to FIG. 2, an enterprise system 200 is shown, according to some embodiments. The enterprise system 200 can be characterized as an extension of the building automation system 100 of FIG. 1 for multiple facilities. Advantageously, the enterprise system 200 uses the same architecture as the building automation system 100, with the architecture being agnostic to the count of the number of different of facilities included, the count of the number of different equipment units included, and of the size of a facility or multiple facilities included in the enterprise system 200. The architecture and other features disclosed herein are thus usable across buildings, campuses, and enterprises of different scales and complexities (an including internal differences in scale and complexity) without change in architecture. In the example shown, the enterprise system 200 includes the cloud tier 102 and instances of the on-premises tier 104 at multiple buildings (shown as three retail branches with on-premises tier 104a, on-premises tier 104b, and on-premises tier 104c, respectively). The enterprise system 200 also includes an instance of the on-premises tier for a different type of building, shown as edge tier 202 for a headquarters building.

In the example of FIG. 2, the cloud tier 102 includes the cloud system 110, the cloud applications 112, and the remote services 114, with user access via unified pane 116. The cloud tier 102 is also shown as including digital twin 204 and a third party cloud 206. The digital twin 204 can be a digital twin as described in U.S. application Ser. No. 17/504,121 filed Oct. 18, 2021, the entire disclosure of which is incorporated by reference herein. The third party cloud 206 can be any cloud system, resource, service, etc. which provides data useful to the cloud applications 112, remote services 114, or digital twin 204 and/or uses outputs of the cloud applications 112, remote services 114, digital twin 204, on-premises tiers 104a-c, or edge tier 202 to provide various functionality in various embodiments.

The edge tier 202 for a headquarters building is shown as including an equipment unit 208 which may be a different type of equipment than equipment unit 106 of on-premises tier 104 as shown in FIG. 1 (and as in on-premises tiers 104a-c in FIG. 2 in various examples). The edge tier 202 may include multiple equipment units 208 in various embodiments. For example the equipment unit 106 for a retail branch may be an rooftop unit while a headquarters building may have other plant equipment as the one or more equipment units 208 (e.g., chiller(s), boiler(s), etc.), or may have a more complex/larger rooftop unit or set of multiple rooftop units. The edge tier 202 also includes edge circuitry 210 coupled to, enclosed with, packaged with, distributed with, integrated with, etc. the equipment unit 208. The edge circuitry 210 advantageously has the same or similar design as edge circuitry 108 of FIG. 1, for example with adaptations for use with the type of equipment of equipment unit 208. Various data sources can be connected thereto as above with reference to FIG. 1, with FIG. 2 showing that complex systems 212 such as an on-premises system performance system, etc. (e.g., hosted on an on-premises server) can be included and communicate directly with the edge circuitry 210 (e.g., without first routing through the cloud system 110) and/or with the cloud system 110. In some implementations, such complex systems 212 may be integrated as a part of the edge circuitry 210.

FIG. 2 is illustrative of the scalability of the architecture of the present disclosure across different facilities, campuses, enterprises, real estate portfolios, equipment distribution networks, service areas, etc., according to some embodiments. Although retail branches and a headquarters is shown in the example shown, various other combinations of different types of facilities are possible (e.g., residential, classroom, athletics, and laboratory facilities of a college campus; hospital, clinic, and pharmacy facilities of a medical group; storefronts, factories, and warehouses of a consumer goods business; hotels and corporate offices for hotel groups; stadiums and corporate offices for the ownership groups; airport terminals and other airport operations facilities and/or office spaces; etc.). The architecture can enable services appropriate for such facilities (e.g., using three-dimensional building models of the relevant buildings) without requiring modification to the underlying architecture of the building automation systems shown in FIGS. 1-2.

Figure 3:
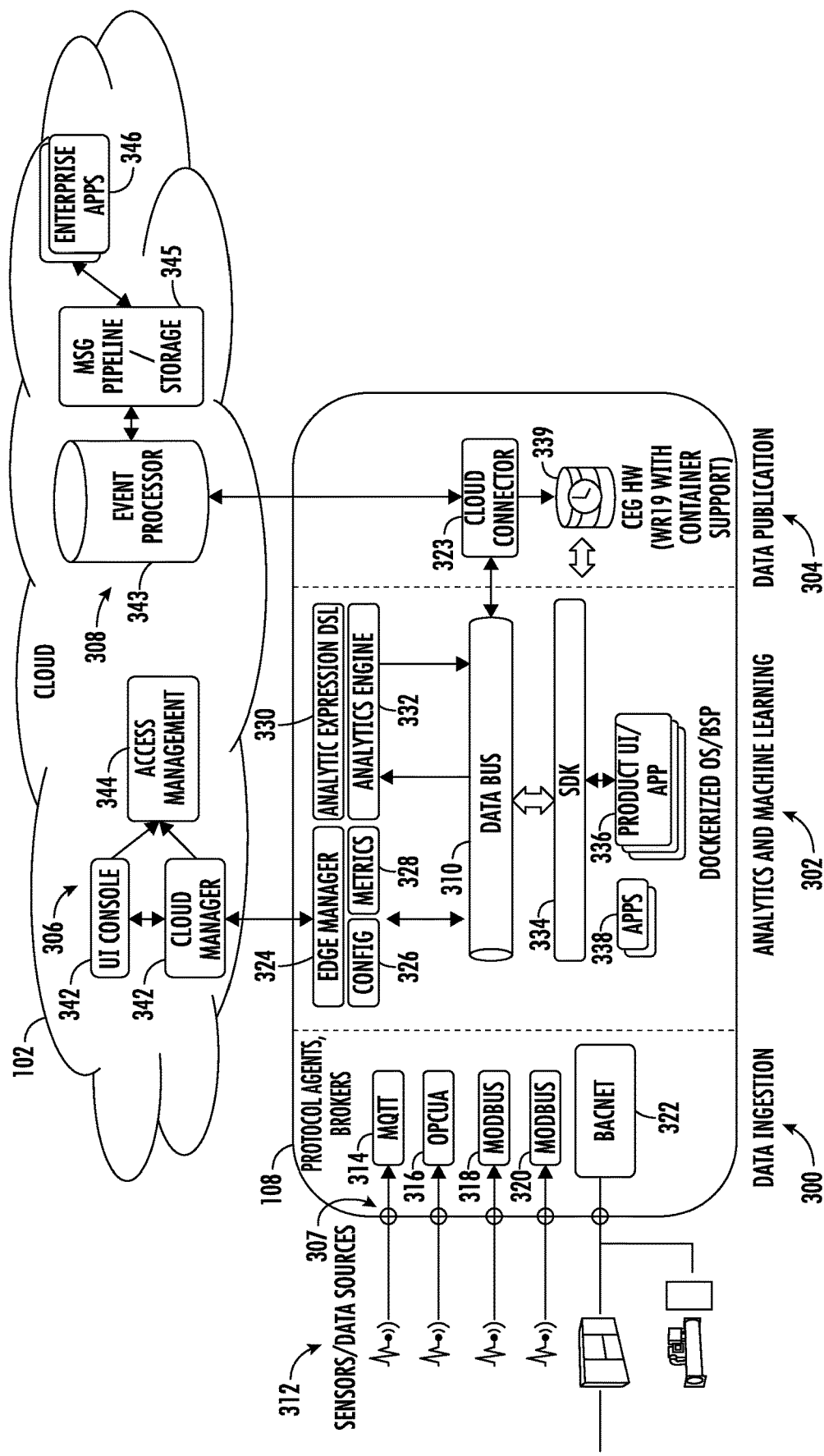
FIG. 3 is a block diagram of edge circuitry and a cloud system of a building automation system, according to some embodiments.

Referring now to FIG. 3, a detailed view of cloud tier 102 interoperating with edge circuitry 108 is shown, according to some embodiments. The edge circuitry 108 is shown as including a data ingestion layer 300, an analytics layer 302, and a data publication layer 304. The cloud tier 102 is shown as including an analytics management portion 306 and a cloud processing portion 308. The analytics management portion 306 interoperates with the analytics layer 302 of the edge circuitry 108 while the cloud processing portion 308 interoperates with the data publication layer 304.

The data ingestion layer 300 is configured to ingest data from multiple sources received from the sources in multiple data formats and using multiple data protocols, translate the data into a common data format, and provide the data in the common data format to a common data bus 310 of the analytics layer 302. In some embodiments, the data ingestion layer 300 and elements thereof can be implemented using features for ingesting and processing streaming data and/or sets of data as described in U.S. Pat. No. 10,007,513, filed Aug. 29, 2016, U.S. Pat. No. 11,048,498, filed Aug. 13, 2019, U.S. Pat. No. 10,572,230, filed Mar. 23, 2017, and/or U.S. Pat. No. 10,564,941, filed Mar. 23, 2017, the disclosures of which are incorporated by reference herein in their entireties. The common data format may be a Brick format, for example, or any other type of common data model. The data ingestion layer may apply tags to the data, for example tags indicating types of the entities, relationships between the entities, for example location, event, asset, and place tags. The data ingestion layer 300 can also provide various pre-processing steps, including normalizing, aligning (e.g., arranging data from multiple sources into discrete values at a common frequency/time step interval), filtering, cleaning, etc. the data received at the data ingestion layer 300 before providing such data to the data bus 310.

As shown in FIG. 3, the data ingestion layer 300 includes multiple inputs 307 (ports, pins, wireless receivers, etc.) that receive signals (data, etc.) from sources 312 and provide such signals to an MQTT agent 314, an OPCUA agent 316, a Modbus agent 318, a DDS agent 320, and a BACnet agent 322. The MQTT agent 314 is configured to translate data from a MQTT protocol to a common data format used by the data bus 310 (e.g., data from an internet-of-things sensor). The OPCUA agent 316 is configured to translate data from a OPCUA protocol to the common data format. The Modbus agent 318 is configured to translate data (e.g., from a building sensor) from a Modbus protocol to the common data format. The DDS agent 320 is configured to translate data from a DDS protocol to the common data format. The BACnet agent 322 is configured to translate the data (e.g., internal data of the unit of building equipment, data from other building equipment) from a BACnet protocol to the common data format. The agents 314-322 can be selectively included and excluded depending on the data protocols of the data sources communicably coupled to the edge circuitry 108, including in some examples by adding an agent for a new protocol via an over-the-air update when a data source using the new protocol is connected. The agents 314-322 can translate the data in real time (e.g., in substantially continuous streams) so that real-time data is provided onto the data bus 310. Such local data translation avoids latency issues which may delay data processing in alternative embodiments where such data translations are performed at an off-premises server. While the agents 314-322 can in some implementations be implemented using software agents, it should be understood that, in other implementations, the protocol brokers/translation layers may be implemented using methods other than software agents.

The analytics layer 302 is configured to execute one or more of multiple types of logic, including control logic (e.g., a PID feedback control loop), expression-based event processing and/or pattern recognition, and/or one or more machine learning or artificial intelligence algorithms/routines (e.g., a machine learning algorithm specifically modified to have a smaller memory footprint thereby enabling edge execution). Such logic is performed using data in a common data format from data bus 310 and can include sending control signals to the equipment unit 106 (i.e., to electromechanical components that operate in accordance with such control signals to affect a condition of a building) or transmitting results to the cloud tier 102 via a cloud connector 323 of the data publication layer 304.

The analytics layer 302 is shown as including the data bus 310, edge manager 324, configurator 326, metrics 328, analytic expression domain specific language 330, analytics engine 332, software development kit 334, product applications 336, and other applications 338. The data bus 310, edge manager 324, configurator 326, metrics 328, analytic expression domain specific language 330, analytics engine 332, and software development kit 334 are shown as exchanging information with the data bus 310, while the other applications 338 and the product applications 336 interoperate with the data bus 310 via the software development kit 334 in the illustration shown.

Figure 4:
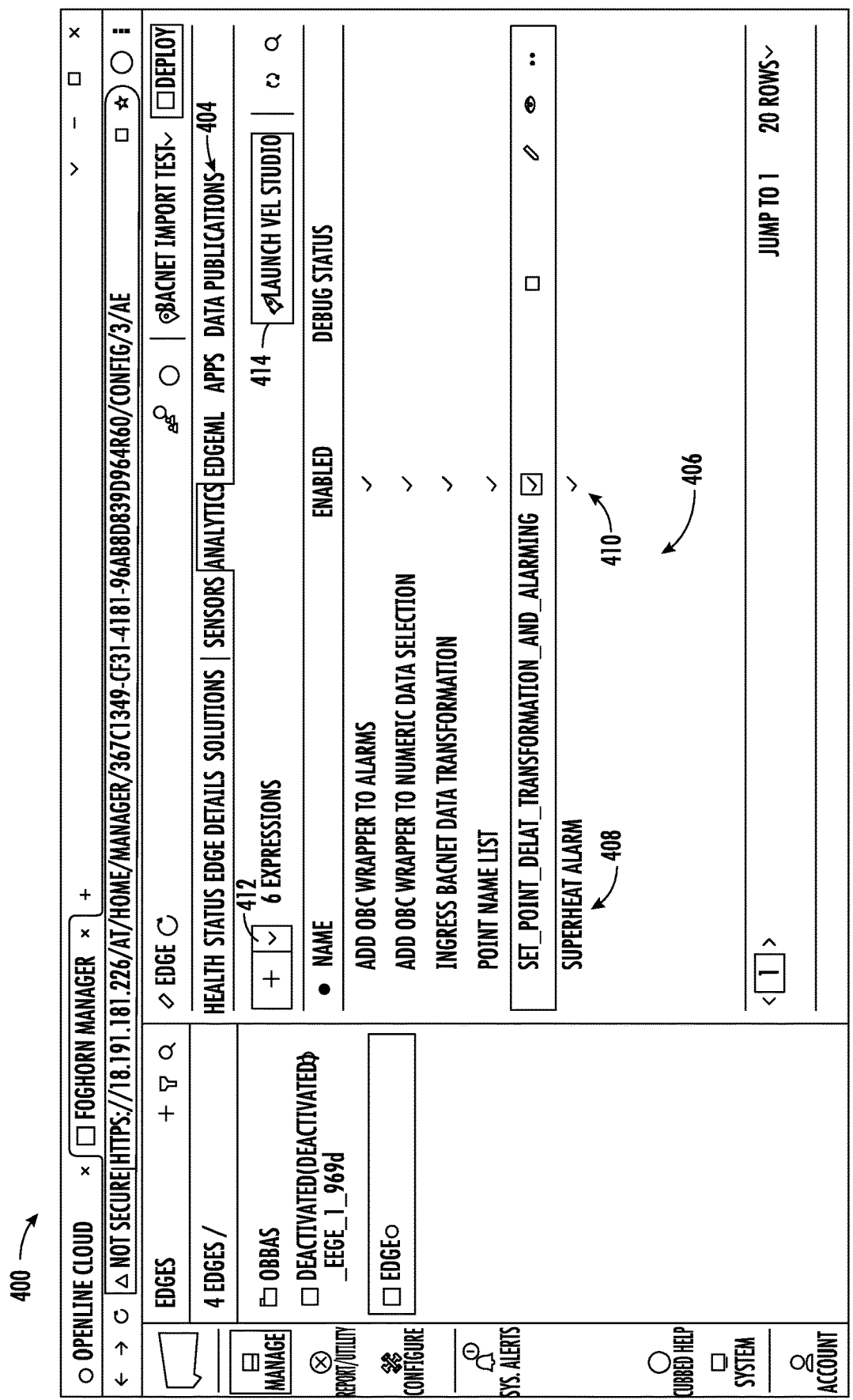
FIG. 4 is an example illustration of a cloud manager interface for managing logic executed by edge circuitry, according to some embodiments.

The edge manager 324 interoperates with a cloud manager 340 of the analytics management portion 306 of the cloud tier 102. The cloud manager 340 provides information and receives inputs from a user interface console 342 (e.g., a browser-based interface hosted by the cloud manager 340 and accessible via the Internet from a person computing device). The cloud manager 340 and the user interface console 342 interact with an access management system 344 which determines whether a user has authority to manage the edge circuitry 108 (e.g., based on login credentials, etc.) and, in response to determining that the user has authority to manage the edge circuitry 108, allowing the user to access the user interface console 342 and to interact with the cloud manager 340. An example interface displayed by the user interface console 342 and providing interactions with the cloud manager 340 to manage analytics executed by the analytics layer 302 is shown in FIG. 4 and described with reference thereto below. New or updated expression-based logic can be transmitted remotely to the edge circuitry 108 to enable over the air updates of the edge circuitry 108 and, in some scenarios, other similar edge circuitry for similar edge devices in a network.

The cloud manager 340 provides for creation of and modifications to various logic executed by the analytics layer 302. As one example, the cloud manager 340 allows a user (via user interface console 342) to select or create expression-based logic for execution by the analytics layer 302. For example, the cloud manager 340 may provide tools and methods for a real-time data flow programming language as described in U.S. Pat. No. 10,977,0101, filed Apr. 21, 2020, and/or U.S. Pat. No. 10,127,022, filed Mar. 23, 2017, the entire disclosures of which are incorporated by reference herein. The expression-based logic may enable complex event processing that can perform real-time analysis of disparate streams of data (e.g., collected on data bus 310), simultaneously perform complex pattern recognition on high frequency and asynchronous streaming data, detect events in real time (enabling immediate response such as closed loop control actions), and handle machine learning pre- and post-processing. For example, the expression-based logic may be selected or customized via the cloud manager 340 to define fault diagnosis rules based on trends in data on the data bus 310 (e.g., comparing rates of change of different variables from different data sources). Such expression-based logic can be stored at analytic expression DSL 330 and executed by analytics engine 332 of the analytics layer 302 of the edge circuitry 108.

As another example, the cloud manager 340 is configured to train a neural network (or other machine learning or artificial intelligence model), for example on historical data of configuration, events, performance, etc. of the equipment unit 106 and/or other equipment units (e.g., similar equipment units serving similar buildings). The cloud manager 340 may provide the trained neural network to the edge manager 324. In some embodiments, the cloud manager 340 modifies the trained model in a manner that reduces the memory and computing resources needed to run an algorithm using the model, and provides the modified model to the edge circuitry 108. The model can be edge-converted ("edge-ified") as described in U.S. Patent Publication No. 2020/0327371, filed Apr. 9, 2019, the entire disclosure of which is incorporated by reference herein. The modified (edge-converted, edge-ified, etc.) model may be usable by the edge circuitry 108 use continuous streams of data as inputs from the data bus 310 and produce inferences (predictions, diagnoses, control outputs) without communication to the cloud tier 102. The cloud manager 340 can periodically update the edge-converted model in a closed-loop manner by interoperating with the edge manager 324, for example. The edge-converted model can be stored by the edge manager 324 on the edge circuitry 108 and used in one or machine learning algorithms, for example executed by the analytics engine 332 of the analytics layer 302. In some embodiments, the edge-converted model is provided onto data bus 310 so that it can be used by apps 338 and product apps 336 via SDK 334.

The cloud manager 340 and user interface console 342 can also enable various other automated or user-selected adjustments of settings and control logic, for example. For example, a user may select temperature setpoints, desired temperature ranges, preferences for comfort versus costs or energy or carbon savings, etc. which may be used by various control logic (e.g., PID feedback controller, extremum seeking controller, etc.), analytics, or model-based processes (e.g., model predictive control, predictive maintenance, etc.) performed by the edge circuitry 108.

Configurator 326 of the analytics layer 302 is configured to automatically determine a configuration for the edge circuitry 108 and the equipment unit 106. The configuration can include multiple parameters that tune the edge circuitry 108 and the equipment unit 106 to or toward ideal performance. In some embodiments, the configurator 326 uses expression-based event processing logic to assess data from the data bus 310 and uses results of such expression-based event processing logic to determine configuration parameters. In some embodiments, the configurator 326 uses a machine learning model (e.g., an edge-converted machine learning model, trained on historical configurations of similar equipment units) to determine a configuration. In some embodiments, the configurator 326 interoperates with the cloud manager 340 to determine the configuration in a hybrid cloud/edge manner, for example with the configurator 326 and the cloud manager 340 determining different subsets of configuration parameters. In some embodiments, the configurator 326 and/or the cloud manager 340 (e.g., in coordination with the user interface console 342) perform operations for automatic configuration as described in U.S. Pat. No. 11,272,011, filed May 19, 2021, the entire disclosure of which is incorporated by reference herein.

As shown in FIG. 3, the analytics layer 302 is dockerized such that various apps 338 and product apps 336, (and analytic expressions, machine learning models, etc.) can be modularly added or removed from the analytics layer 302, for example via over-the-air updates. The apps 338 and product apps 336 can include various control logic for the equipment unit 106, for example. The apps 338 and the product apps 336 can include various other programs, analytics, metrics calculators, visualization generators, etc. that enable various capabilities for the equipment unit 106.

The edge circuitry 108 is further shown as including the data publication layer 304. The data publication layer 304 includes cloud connector 323 and CEG HW 339. The cloud connector 323 is configured to provide a bridge between the edge circuitry 108 (e.g., the data bus 310) and the cloud tier 102 (e.g., the cloud processing portion 308), for example as described in U.S. Provisional Patent Application No. 63/296,078, filed Jan. 3, 2022, the entire disclosure of which is incorporated by reference herein. The CEG HW 339 provides for data updates to and from the cloud tier 102, for example via SDK 334.

Figure 5:
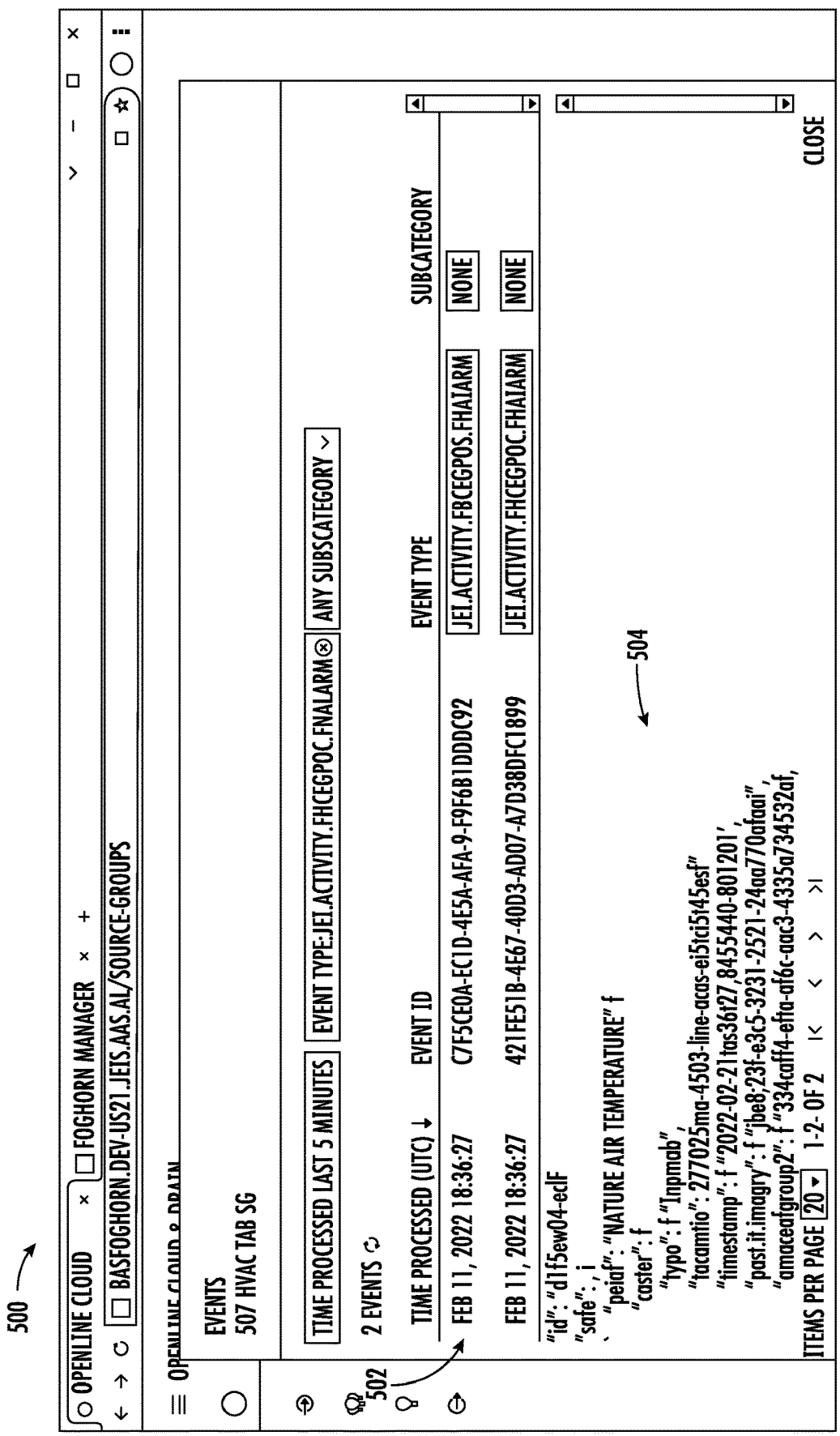
FIG. 5 is an example illustration of an events viewer interface showing event alerts generated by the edge circuitry using logic managed by the cloud manager, according to some embodiments.
Figure 6:
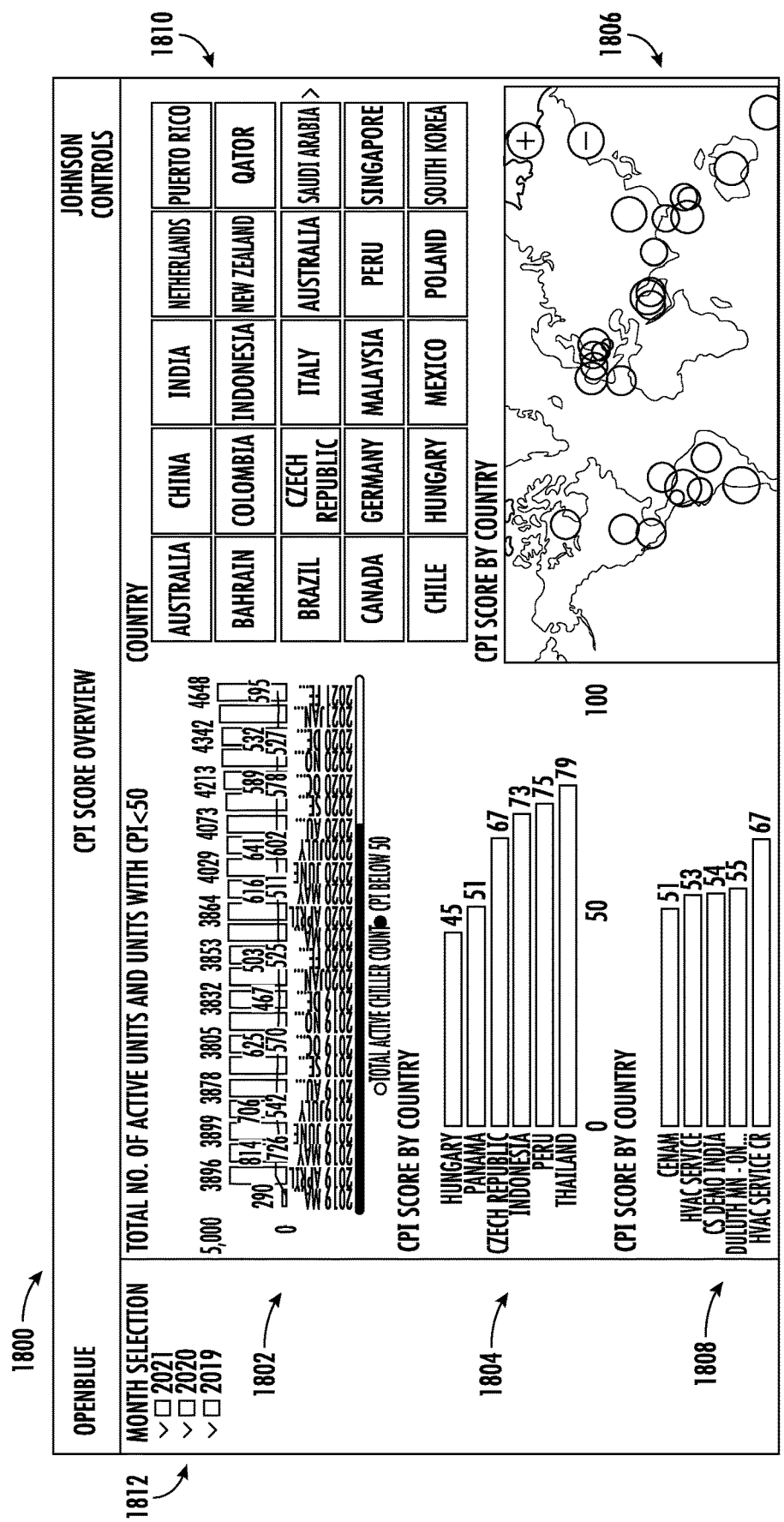
FIG. 6 is a first view in a distributor dashboard, according to some embodiments.
Figure 7:
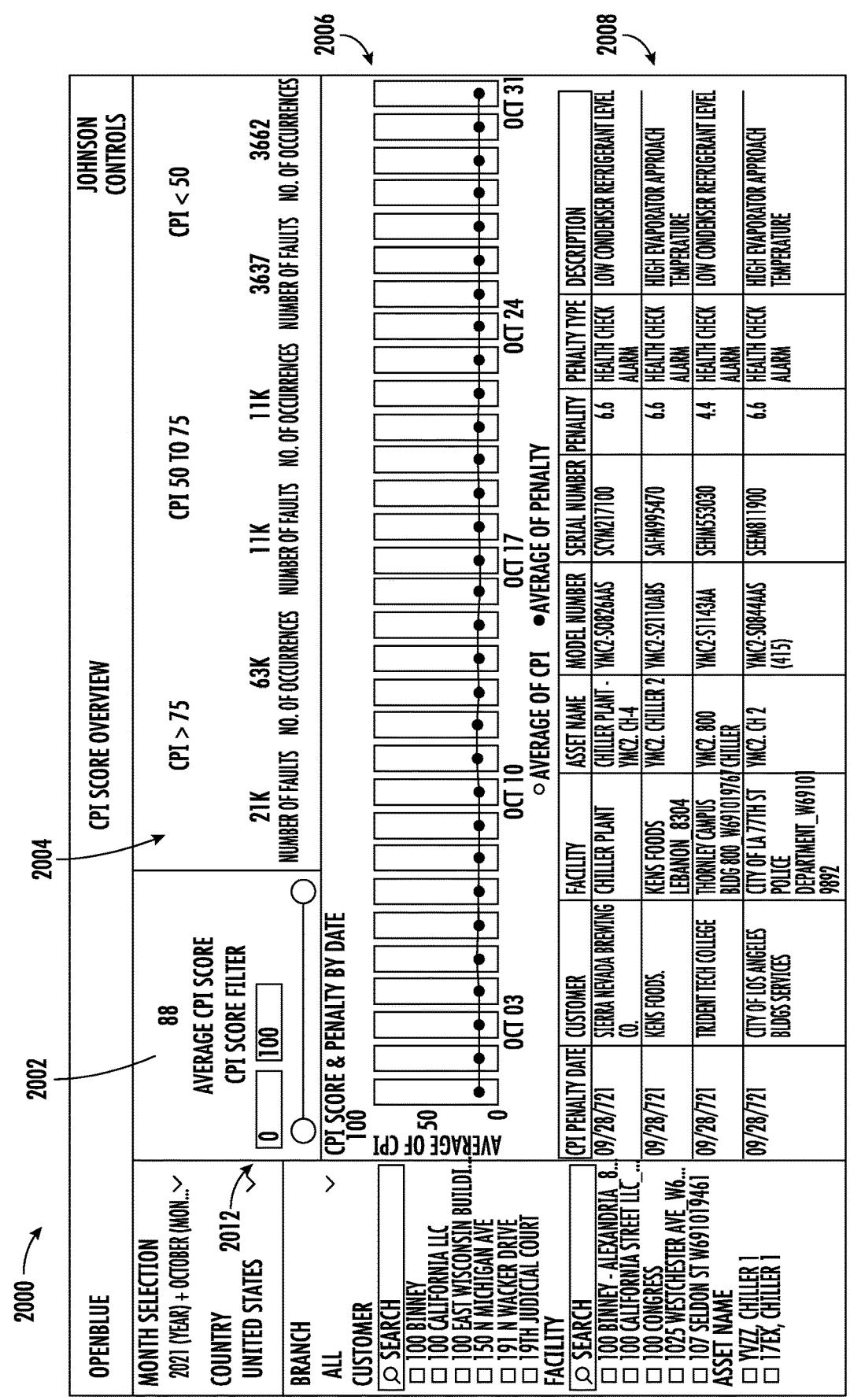
FIG. 7 is a second view in the distributor dashboard, according to some embodiments.

The cloud processing portion 308 of the cloud tier is shown as including an event processor 346, a message pipeline/storage 348, and enterprise applications 350. The event processor 346 may be configured to receive data and analytics outputs from the edge circuitry 108 and store such outputs. The event processor 346 may also be configured to perform additional (e.g., higher-level) analytics and processing of such information to generate additional insights and actionable steps or recommendations relating to the equipment unit 106. The message pipeline/storage 348 provides for communication between the event processor 346 and enterprise applications 350. The enterprise applications 350 can include various cloud-based capabilities associated with managing, tracking, and/or affecting operation of the equipment unit 106 and, in some scenarios other building equipment communicable with the cloud tier 102. For example the enterprise applications 350 may provide a distributor dashboard enabling comparison of equipment performance, events, etc. across many units of equipment, different facilities, different customers, different equipment owners, different technicians or sales representatives, etc. As another example, the enterprise applications 350 can provide a user interface (e.g., via a mobile application, via a webpage hosted by enterprise applications 350, etc.) that enables a user to view events, faults, etc. for the equipment unit 106 (e.g., as shown in FIG. 5 and described with reference thereto below) or a fleet of equipment as shown in FIGS. 6-7.

Referring now to FIG. 4, a view of an interface 400 provide user interface console 342 is shown, according to some embodiments. In the example shown, the interface 400 provided by the user interface console 342 is a webpage hosted by the analytics management portion 306 of the cloud system and shown as being accessed by and displayed on a personal computing device (e.g., laptop computer, desktop computer, etc.). In some embodiments, the interface 400 is provided on unified pane 116.

The interface 400 includes a menu 402 that includes buttons that enable a user to navigate to an edge device (e.g., edge circuitry 108) of a set of possible edge devices that can be managed by the analytics management portion 306 (e.g., multiple edge devices for a building site or portfolio). The menu 402 can include filtering and search features. In some embodiments, multiple edge devices (e.g., all edge devices of a selected equipment type) can be selected together and managed together.

The interface 400 also includes a tabs bar 404. The tabs bar 404 allows a user to select to view different information and different manageable features for a selected edge device. As shown, the tabs bar 404 includes selectable tabs for health, status, edge details, and solutions which show information about the edge devices. The tabs bar 404 also lists sensors, analytics, edge machine learning (ML), apps, and data publications which may correspond to views that provide customizable/manageable features of the device. In the example shown, an analytics tab 406 is selected from the tabs bar 404.

The analytics tab 406 is shown as including a list 408 of analytics (and/or other operations) available for execution by the edge device. As shown, the analytics may include data ingestion and tagging features, for example executable by the data ingestion layer 300 of the edge circuitry 108. The analytics are also show as including alarms and event processing that can be executed by analytics engine 332 of the edge circuitry 108 using expression-based programming, for example a set point delta transformation and alarming expression-based program. The analytics tab 406 also includes a column 410 indicating whether each item on the list 408 is enabled on the edge device (as shown, all listed items are enabled).

The analytics tab 406 also includes an add button 412. The add button 412 is selectable to add one or more additional analytics. The added analytics can be preprogrammed expressions in an expression-based language, for example, thereby allowing a user to select from a set of expert-created and validated expression-based logic. The analytics can also be user-created, for example via an expression language studio interface accessible by selecting a launch button 414 of the analytics tab 406. The studio interface may provide an intuitive experience for creating logic in an expression-based language for execution by the edge circuitry 108, in some examples without requiring software programming expertise. For example, the interface 400 may provide a development environment and programming language as described in U.S. Pat. No. 10,977,010, filed Apr. 21, 2020, the entire disclosure of which is incorporated by reference herein.

The analytics tab 406 thereby provides a user with options to remotely select, unselect, and customize logic to be executed by the edge circuitry 108. The logic executed by the edge circuitry 108 can thus be easily modified and updated remotely via the cloud manager 340. In some embodiments, many instances of the edge circuitry 108 (e.g., for multiple units of the same time of equipment installed at a facility or multiple facilities) can be updated together using the analytics tab 406, thereby enabling over-the-air customization of a fleet of equipment units.

Referring now to FIG. 5, an events interface 500 is shown, according to some embodiments. The events interface 500 can be provided on unified pane 116, for example. The events interface provides a list of events which occurred for a particular building or space. As shown, the events interface 500 shows a list of events detected locally at the equipment unit 106 by edge circuitry 108 executing expression-based pattern recognition logic activated via interface 400. The edge circuitry 108 can locally determine the occurrence of such events and provide information indicating that an event occurred to the cloud tier 102 without all data necessary to detect such an event uploaded to the cloud tier 102. Such an architecture can save bandwidth and cloud storage requirements, for example. The events interface can then provide a list 502 of such events and a details area 504 showing further details of the contextual data provided event notifications from the edge circuitry 108 (e.g., time stamp, event type, relevant points, etc.). The event data can also be provide in various other interfaces of a building automation system, for example integrated alongside building performance data and options for remotely controlling building equipment.

Referring now to FIGS. 6-7, dashboards for viewing data for a fleet of equipment units, for example data provided from edge circuitry of said fleet of equipment units, are shown, according to some embodiments. The dashboard 1800 of FIG. 6 and the dashboard 2000 of FIG. 7 can be provided on unified pane 116, for example. The dashboards 1800, 2000 may be provided as part of enterprise applications 350 as shown in FIG. 3, for example. Advantageously, the dashboards provide aggregated data for multiple equipment units for different building sites and, in some examples, equipment units owned or leased by different customers or building owners. The dashboards thereby enable a service branch, distributor, sales representative, technician, manufacturer expert, etc. to review performance across customers and sites, identify trends or outliners, determine areas or customers for updates, upgrades, maintenance, etc., and otherwise more easily manage large fleets of building equipment.

Referring particularly to FIG. 6, a dashboard 1800 is shown, according to some embodiments. The dashboard 1800 shows a monthly comparison widget 1802, a country graph widget 1804, a map widget 1806, a branch widget 1808, a country selection widget 1810, and a month selection widget 1812 arranged to be displayed simultaneously on a display screen of a user device (e.g., via unified pane 116).

The monthly comparison widget 1802 shows a total number of active units (e.g., rooftop units, chillers, other types of equipment) with a performance score (shown as a connected equipment performance index as described in U.S. Pat. No. 11,092,954, field Jan. 10, 2019, the entire disclosure of which is incorporated by reference herein) of less than a threshold value (shown as less than 50). In some examples, the performance scores is calculated locally on each unit of equipment, for example using expression-based analytics and/or machine learning algorithms. Performance scores below the threshold value can be considered as poorly performing, in need of control adjustments, in need of maintenance, or otherwise in need of intervention. The monthly comparison widget 1802 can be generated by processing the aggregated data from step 1704 and counting, for each month period a number of different devices associated with connected equipment performance indices for that month less than the threshold value and then displaying those total numbers as a bar graph as shown in FIG. 18. The monthly comparison widget 1802 can show a user general trends in how a fleet of connected equipment is degrading (increasing the number of poor performing units) and/or being serviced or better operated (decreasing the number of poor performing units) over time, e.g., over a period of two years on a month-to-month basis as in the example of FIG. 6.

The country widget 1804 displays a bar graph of the connected equipment performance index associated with each of multiple countries. Other geographic distinctions are included in other examples (neighborhoods, campuses, cities, counties, states, etc.). For example, the value for each country may be an average of all performance scores for all of the units of connected equipment in the particular country (or a median, etc. in other embodiments). The country widget 1804 may arrange the countries in order from worst (e.g., lowest) score to best (e.g., highest) score, so that a user can easily see which region has the worst-performing connected equipment. Although the example shows scores by country, other geographic categorizations can be used in various embodiments (states, territories, counties, states, regions, cities, neighborhoods, campuses, etc.). The country widget 1804 can allow a user to determine where to focus attention for improvements, maintenance, and other interventions.

The map widget 1806 shows similar data as the country widget 1804 visualized in a map view. In particular, the map widget 1806 shows a map (shown as a world map, but may be a map of a smaller region in other embodiments) which data visualized on the map to show connected equipment performance index values for different geographic regions shown on the map. In the example shown, each country in which connected equipment is located is provided with a circle (e.g., colored and/or shaded circle) which is sized and/or colored based on an average or other aggregate performance score associated with that country. In some embodiments, a larger circles indicates better scores while smaller circles indicate lower scores (or vice versa in other embodiments). In some embodiments, each country has a circle sized based on a number of units of connected equipment located in that country while the circles are colored based on performance index values (e.g., green for good/high values, yellow for moderate values, red for bad/low values). The map widget 1806 thus shows a graphical view of equipment performance across geographic areas.

The branch widget 1808 shows a graph of performance scores (e.g., connected equipment performance indices) for different branches, i.e., for different business units, departments, subgroups, subsidiaries, customers, service technicians, sales representatives, etc. associated with sets of connected equipment. As shown in FIG. 6, the branch widget 1808 shows a bar graph with a bar for each different branch, or at least for a subset of all different branches included in a given scenario (e.g., for the branches with the worst five scores). The branch widget 1808 may order the graph so that the worst branch (i.e., with the worst/lowest score) is shown first, enabling a user to easily see the branch which needs the most intervention, attention, maintenance, investment, etc. based on the aggregated data visualized on dashboard 1800.

The country selection widget 1810 and the month selection widget 1812 are configured to enable a user to reduce the amount of data displayed on the dashboard 1800. The month selection widget 1810 allows a user to select a month or subset of months for which the dashboard 1800 will display data and visualizations. For example, if a user selects a few months from a set of available months, the monthly comparison widget 1802, the country graph widget 1804, the map widget 1806, and the branch widget 1808 will update so that the monthly comparison widget 1802, the country graph widget 1804, the map widget 1806, and the branch widget 1808 visualizes data for the selected months. Other time periods (years, seasons, days of the week, particular dates, parts of days, hours, etc.) could be selectable in the same manner in various embodiments.

The country selection widget 1810 provides a button for each country included in the data and allows a user to select the countries for which data is desired to be displayed on the dashboard 1800. Other types of geographic areas (regions, states, territories, counties, cities, etc.) can be similarly selectable in other embodiments. In the example shown, if a user selects a subset of countries, the monthly comparison widget 1802, the country graph widget 1804, the map widget 1806, and the branch widget 1808 will update so that the monthly comparison widget 1802, the country graph widget 1804, the map widget 1806, and the branch widget 1808 visualizes data for the selected countries.

Referring now to FIG. 7, a dashboard 2000 of equipment fleet data is shown, in particular including a visualization of data from a selected one-month period. A user may be enabled to navigate to the dashboard 2000 via the dashboard 1800 of FIG. 6. The dashboard 2000 includes an average score widget 2002, an index buckets widget 2004, a timeline widget 2006, and events widget 2008, a field selection widget 2010, and a score filter widget 2012.

The average score widget 2002 is configured to show an average performance score for the subset of data represented in the selected (filtered) dataset. The index buckets widget 2004 shows the number of faults and the number of occurrences corresponding to equipment performance scores in different ranges (shown as greater than 75, between 50 and 75, and less than 50). The faults, performance scores, etc. can be calculated at the edge and then aggregated at the cloud for display via the dashboard 2000, thereby reducing bandwidth on network communications and resource demand on a cloud system that would be present in an embodiment where all data is uploaded to the cloud and processed there to identify faults and calculate performance scores.

The timeline widget 2006 is configured to show a bar chart of connected equipment performance scores for each day in the selected month, spatially arranged in temporal order. The bar chart is overlaid with a line chart representing an average penalty value for each day. The timeline widget 2006 thereby shows a performance score and a penalty value for each day, for example so that a user could easily and quickly see any trends which occurred over the course of the selected month.

The events widget 2008 is configured to show events which occur relating to the connected equipment in the selected month (or satisfying other filter criteria). Events may include detected faults, alarms, or other notable conditions or events relating to the connected equipment. The events widget 2008 can list the date, entity, facility, particular equipment asset, model number, serial number, penalty value, penalty type, and description for each event, for example. Events can be determined at the edge by the equipment using complex expression-based event processing, for example.

The field selection widget 2010 is configured to present lists of categorizations from which the user can select particular filters to further apply to the data used to generate the dashboard 2000. For example, the field selection widget 2010 is shown as including a customer list (allowing selection of one or more customers or other entities), a facility list (allowing selection of one or more particular facilities), and an asset name list (allowing selection of particular equipment assets). Once one or more additional fields are selected by a user via the field selection widget 2010, the dashboard 2000 updates so that the widgets 2002-2008 visualize data corresponding only to the selected fields. A user is thereby enabled to select the particular dataset(s) the user wishes to see visualized on the dashboard 2000.

The score filter widget 2012 is configured to accept a request to update the dashboard 2000 to only visualize data corresponding to performance scores in a user-selectable range. FIG. 20 shows the score filter widget 2012 set to show scores between 0 and 100, with the upper value and the lower value adjustable by numerical input or by digital manipulation of a slider feature. For example, if a user resets the range shown in score filter widget 2012 to scores between thirty and 70, the widgets 2002-2008 will update to only show data corresponding to such data points. As one example, the events widget 2008 will be updated to only show events which occurred while performance was scored in the selected range. The dashboard 2000 thereby enables yet another way to sort and filter the displayed data.

The dashboard 1800 and the dashboard 2000 thereby provide various ways of visualizing and understanding advance performance information from units of building equipment spread across buildings, geography, end users, technicians, etc. Such dashboards can be enabled in a seamless manner by performing the advanced event processing and performance scoring at the edge for each unit of equipment, and then aggregating that higher-level information at the cloud tier 102 for display to a user. Efficient and reliable presentation of the dashboard 1800 and the dashboard 2000, with little or no manual configuration, is thereby enabled by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A rooftop unit comprising:

a housing;

air conditioning components coupled to the housing; and onboard circuitry enclosed within and/or coupled to the housing and comprising inputs configured to receive signals from a plurality of sources communicably coupled to the onboard circuitry;

wherein the onboard circuitry is programmed to:

execute a configuration routine stored on the onboard circuitry configured to automatically configure a first parameter of the onboard circuitry based on the signals received via the inputs;

receive a second parameter for the onboard circuitry from a cloud system; and execute a control process using the first parameter and the second parameter of the onboard circuitry to generate control outputs for the air conditioning components based on the signals from the plurality of sources; and wherein:

the onboard circuitry is configured to detect a removal of a source of the plurality of sources; and the configuration routine is configured to update the first parameter in response to the removal.

2. The rooftop unit of claim 1, wherein the configuration routine comprises pattern recognition performed using an expression-based processing language.

3. The rooftop unit of claim 1, wherein the configuration routine uses a machine learning model stored and executed on the rooftop unit.

4. The rooftop unit of claim 1, wherein the configuration routine is configured to identify devices associated with the signals and wherein automatically configuring the first parameter is based on identities of the devices.

5. The rooftop unit of claim 1, wherein automatically configuring the first parameter is based on point values represented by the signals.

6. The rooftop unit of claim 1, wherein automatically configuring the first parameter is based on a plurality of data protocols used by the plurality of sources.

7. The rooftop unit of claim 1, wherein executing the configuration routine comprises:

executing a first routine on the onboard circuitry of the rooftop unit; and responsive to triggering of a condition of the first routine, causing execution of a second routine by a cloud system communicable with the onboard circuitry and receiving the second parameter from the cloud system in response.

8. The rooftop unit of claim 1, wherein the configuration routine is trained based on a history of configurations of other rooftop units.

9. The rooftop unit of claim 8, wherein the configuration routine is trained based on the history of configurations of other rooftop units and data relating to other devices in or on a same building or space as the other rooftop units.

10. The rooftop unit of claim 1, wherein:
the onboard circuitry is configured to detect a trend in a value of a point provided by a first source of the plurality of sources; and
the configuration routine is configured to adjust the first parameter based on the trend.

11. The rooftop unit of claim 1, wherein the onboard circuitry is configured to adjust the first parameter based on comparison of or a trend in values of a plurality of points received from two or more different sources of the plurality of sources.

12. The rooftop unit of claim 1, wherein the plurality of sources comprise:
local sources located at a same facility as the rooftop unit;
internal sources at or proximate the rooftop unit;
peer sources communicating in a peer-to-peer fashion with the onboard circuitry; or
external sources communicating directly with the onboard circuitry or only via devices located at the same facility.

13. A system comprising:
a unit of building equipment serving a building and comprising:
a heating, ventilation, or cooling component;
onboard circuitry configured to execute a configuration routine stored on the onboard circuitry which automatically configures a first parameter of the onboard circuitry based on signals received from sensors and devices at the building, wherein the configuration routine is trained based on other configuration parameters for other onboard circuitry of other units of building equipment; and
a cloud system communicably connectable to the onboard circuitry and configured to provide a second parameter for the onboard circuitry;
wherein the onboard circuitry is configured to detect a removal of at least one sensor or device of the sensors and devices at the building, the configuration routine is configured to update the first parameter in response to the removal, and the onboard circuitry is configured to control the heating, ventilation, or cooling component using the first parameter and the second parameter.

14. The system of claim 13, wherein the cloud system is configured to influence the configuration routine by training a machine learning model based on historical configurations comprising the other configuration parameters for the other onboard circuitry of other units of building equipment and providing a result of the training to the onboard circuitry for use in the configuration routine.

15. The system of claim 14, wherein the cloud system is configured to create a modified version of the machine learning model trained at the cloud system that is configured to execute on more limited processing resources of the onboard circuitry relative to the cloud system and provide the modified version to the onboard circuitry.

16. The system of claim 13, wherein the cloud system is configured to influence the configuration routine by:
training a machine learning algorithm on historical configurations comprising the other configuration parameters for the other onboard circuitry of other units of building equipment;
using the machine learning algorithm to determine a set of rule-based or expression-based logic; and
pushing the set of rule-based or expression-based logic to the onboard circuitry for execution by the onboard circuitry as a part of the configuration routine.

17. The system of claim 13, wherein the cloud system is configured to provide the second parameter to the onboard circuitry based on a characteristic of the signals, wherein the onboard circuitry is configured to provide the characteristic to the cloud system without providing the signals to the cloud system.

18. The system of claim 13, wherein the onboard circuitry is further configured to provide the first parameter to the cloud system, and wherein the cloud system stores the parameters in a digital twin.

19. The system of claim 13, wherein the onboard circuitry is further configured to store a digital twin and integrate the first parameter and the second parameter into the digital twin.

20. A method comprising:
providing a package comprising a heating, ventilation, or cooling component and onboard circuitry;
connecting the onboard circuitry to a plurality of data sources and to a cloud system;
determining, by the onboard circuitry, a first parameter of a configuration of the onboard circuitry based on the data;
detecting, by the onboard circuitry, characteristics of data received from the plurality of data sources and forwarding the characteristics to the cloud system;
generating, by the cloud system, a second parameter of the configuration for use by the onboard circuitry in managing operations of the heating, ventilation, or cooling component;
automatically configuring the onboard circuitry in accordance with the first parameter and the second parameter;
detecting, by the onboard circuitry, a removal of a data source of the plurality of data sources; and
updating, by the onboard circuitry, the first parameter in response to the removal.

21. The method of claim 20, generating the configuration comprises using the characteristics as inputs to a machine learning model trained on historical configurations for other building equipment communicable with the cloud system.

22. The method of claim 20, wherein the plurality of data sources comprise:
local sources located at a same facility as the heating, ventilation or cooling component;
internal sources at or proximate the heating, ventilation or cooling component;
peer sources communicating in a peer-to-peer fashion with the onboard circuitry; and
external sources communicating directly with the onboard circuitry or only via devices located at the same facility.

23. A unit of building equipment, comprising:
onboard circuitry comprising inputs configured to receive signals from a plurality of sources communicably coupled to the onboard circuitry;
wherein the onboard circuitry is programmed to execute a configuration routine stored on the onboard circuitry configured to automatically configure the onboard circuitry based on the signals received via the inputs by:
determine a first portion of the configuration for the onboard circuitry;
detecting a characteristic of the signals received via the inputs;
providing the characteristic to a cloud system without providing the signals to the cloud system;
receiving a second portion of the configuration for the onboard circuitry from the cloud system;
detecting a removal of a source of the plurality of sources; and
updating the first parameter in response to the removal.

* * * * *